United States Patent Office 3,819,744
Patented June 25, 1974

3,819,744
POLYDIORGANOSILOXANE-POLYCARBONATE BLOCK COPOLYMERS
Werner Büchner, Leichlingen, Walter Noll, Opladen, and Bernd Bressel, Cologne, Germany, assignors to Bayer Aktiengesellschaft, Leverkusen, Germany
No Drawing. Filed Dec. 7, 1972, Ser. No. 313,073
Claims priority, application Germany, Dec. 16, 1971, P 21 62 418.0
Int. Cl. C08g 47/02
U.S. Cl. 260—824 R          5 Claims

ABSTRACT OF THE DISCLOSURE

A polydiorganosiloxane-polycarbonate block copolymer comprising by weight about 20 to 90% of polydiorganosiloxane units of the formula

(I)

and about 80 to 10% of polycarbonate units of the formula

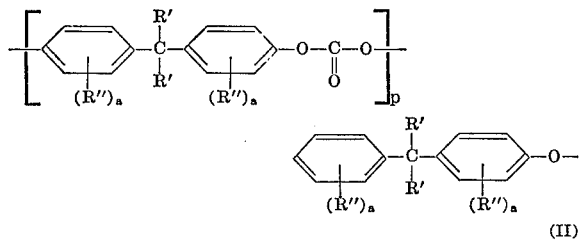

(II)

the copolymer having terminal groups of the formula

(III)

wherein each R independently is a monovalent optionally substituted aliphatic, cycloaliphatic, araliphatic or aromatic hydrocarbon radical with 1 to 12 carbon atoms,
each R' independently is hydrogen or a monovalent optionally substituted aliphatic, cycloaliphatic, araliphatic or aromatic hydrocarbon radical with 1 to 12 carbon atoms,
each R'' independently is a lower alkyl radical or a halogen atom,
each X is a halogen atom, a hydroxyl radical or lower alkoxy radical,
$n$ is an integer from 2 to 100,
$p$ is an integer from 1 to 7, and
$a$ is an integer from 0 to 4.

The copolymers are produced by reacting 1 mole of an α,ω-dihydroxypolycarbonate, dissolved in an inert organic solvent, with about 1.05 to 2 moles of an α,ω-dichloropolydiorganosiloxane in the presence of a quantity of a tertiary amine stoichiometrically equivalent to the chlorine content of the α,ω-dichloropolydiorganosiloxane at a temperature up to about 100° C., filtering off the amine-salt and removing the solvent.

---

This application relates to polydiorganosiloxanes-polycarbonate block copolymers.

U.S. Patent Specification No. 3,189,662 describes copolymers whose skeleton is composed of polydiorganosiloxane and polycarbonate segments, produced by reacting α,ω-dichloropolydiorganosiloxanes with hydroxy phenols, followed by reaction of the resulting intermediate produced with phosgene. The chain ends of such copolymers do not contain any silicon-functional groups so it is not possible with these compounds to carry out any reactions that are dependent upon the presence of organo-silicon groups. For this reason, such polymers cannot readily be subjected to crosslinking reactions, for example.

The introduction of silicon-functional radicals is described, for example, in U.S. Patent Specification No. 3,419,635. However, the process described in that Patent Specification has the disadvantage that it can only be carried out by way of complicated, multiple-stage reactions which, furthermore, always lead to terminal silicon-functional groups of the kind which are attached to the polymer through an Si—C— bond. Neither can the formation of polycarbonate homopolymers be ruled out in conventional synthesis processes because the chain length of the polycarbonate segments is adjusted by the addition of excess dihydroxy phenol and by its incorporation during the phosgenation reaction.

It is accordingly an object of the present invention to provide novel polydiorganosiloxane-polycarbonate block copolymers which are capable of crosslinking or other reactions characteristic of siloxane polymers free of polycarbonate blocks.

In accordance with the present invention there are provided novel polydiorganosiloxane-polycarbonate block copolymers comprising by weight about 20 to 90% of polydiorganosiloxane units of the formula

(I)

and about 80 to 10% of polycarbonate units of the formula

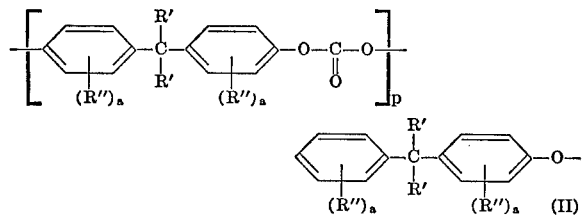
(II)

the copolymer having terminal groups of the formula

(III)

wherein each R independently is a monovalent optionally substituted aliphatic, cycloaliphatic, araliphatic or aromatic hydrocarbon radical with 1 to 12 carbon atoms,
each R' independently is hydrogen or a monovalent optionally substituted aliphatic, cycloaliphatic, araliphatic or aromatic hydrocarbon radical with 1 to 12 carbon atoms,
each R'' independently is a lower alkyl radical or a halogen atom,
each X is a halogen atom, a hydroxyl radical or lower alkoxy radical,
$n$ is an integer from 2 to 100.
$p$ is an integer from 1 to 7, and
$a$ is an integer from 0 to 4.

Preferably R is a lower alkyl radical of 1 to 4 carbon atoms. R'' can represent, for example, a methyl, ethyl, propyl, isopropyl, butyl, isobutyl, tertiary butyl radical or a chlorine, bromine or iodine atom, although $a$ is preferably 0. R' can represent an alkyl radical, for example methyl, ethyl, propyl, or butyl; an alkenyl radical, for example vinyl; a cycloalkyl radical, for example cyclohexyl; a halogen alkyl radical, for example chlorobutyl; a substituted or unsubstituted aryl radical, for example phenyl, chlorophenyl, xylyl or tolyl; an araliphatic radical such as phenyl ethyl or benzyl. Preferably R′ is a lower alkyl radical of 1 to 4 carbon atoms, especially methyl.

The polydiorganosiloxane-polycarbonate block copolymers according to the invention are obtained by reacting an α,ω-dichloropolydiorganosiloxane of the formula:

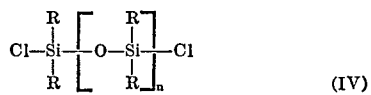

with an α,ω-dihydroxy polycarbonate of the formula:

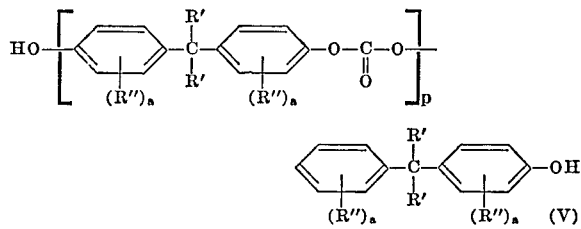

(wherein the symbols have the same meaning as in formulas I to III) in the presence of a tertiary amine. The process is carried out by reacting 1 mole of the α,ω-dihydroxy polycarbonate, dissolved in an inert organic solvent, with about 1.05 to 2 moles of the α,ω-dichloropolydiorganosiloxane in the presence of a quantity of a tertiary amine stoichiometrically equivalent to the chlorine content of the α,ω-dichloropolydiorganosiloxane, subsequently heating the reaction mixture to a temperature of about 60 to 100° C., and isolating the reaction product by filtering off the amine salt and removing the solvent.

The reaction can be carried out in any organic solvents in which the polycarbonates are soluble. Chlorobenzene or dichlorobenzene, for example, are preferably used.

The concentration of the polycarbonate solution amounts to between about 5 and 40% by weight and preferably to between about 10 and 30% by weight. It has proved to be of particular advantage to use pyridine as the amine for reacting with the hydrochloric acid formed during the reaction. However, other tertiary amines such as triethyl amine for example are equally suitable. The reaction is initially carried out at temperatures of about 10° C. to 60° C. and most preferably at temperatures of about 20° C. to 30° C. The pressure conditions are not especially critical. The reaction is preferably carried out at atmospheric pressure although a slight reduced pressure or excess pressure has no apreciable effect upon the reaction.

α,ω-dichloropolydiorganosiloxanes and polycarbonates are used as starting materials for the copolymers according to the invention. The α,ω-dichloropolydiorganosiloxanes can be obtained by known methods (cf. for example U.S. Patent Specification No. 2,381,366); α,ω-dichloropolydialkylsiloxanes for example are suitable as starting materials, as are corresponding siloxanes containing dialkylsiloxy and diarylsiloxy units in statistical distribution. α,ω-dichloropolydimethylsiloxane is preferred. The average chain length preferably amounts to between about 15 and 100 siloxane units, although it can also be below or above this range.

The polycarbonates with terminal hydroxyl groups used as starting material preferably have a chain length of about 2 to 5 diphenyl alkane units and can be derived from any bisphenol. It is preferred to use the polycarbonate having a chain length of p=2–4 and derived from 2,2-bis-(p-hydroxy phenyl)-propane ("bisphenol A"), i.e. R′=CH₃ and a=0.

Other bisphenols suitable for the production of polycarbonate are described for example in U.S. Patent Specifications Nos. 3,028,365, 2,999,835, 3,148,172, 3,271,368, 2,970,137, 2,991,273, 3,271,367, 3,014,891 and 2,999,846.

The block copolymers with terminal chlorodiorganosilyl groups initially formed can be converted into those with the corresponding terminal alkoxy diorganosilyl or terminal hydroxy diorganosilyl groups by reaction with alcohols or water.

The properties of the polydiorganosiloxane-polycarbonate copolymers according to the invention can be adjusted as required. They are influenced above all by the ratio of the chain lengths of the siloxane and polycarbonate segments which can readily be adjusted. If the chain length of the polycarbonate segments is maintained constant, the hardness of the block copolymers and their softening temperature, for example, increase with decreasing chain length of the polydiorganosiloxane segments. If, in contrast, the polycarbonate chains are shortened without any change in the molecular weight of the siloxane segments, hardness and softening point are reduced. The process according to the invention also enables the properties of the block copolymers to be influenced by reacting α,ω-polydiorganosiloxanes of different chain lengths simultaneously as a mixture or successively as individuals with α,ω-dihydroxy polycarbonates.

Additives such as solvents, fillers, hardening catalysts, can also be used during processing of the block copolymers.

The copolymers can be used as such to form shaped objects or they may be chemically modified. The fact that the block copolymers have silicon-functional terminal groups enables all the reactions characteristic of the radical III to be carried out on the block copolymers. Thus, particular reference is made to the reaction of the block copolymers with cross-linking compounds, for example methyl triacetoxy silane, from which rubber-like products are obtained after the action of moisture. Elastic end products of this kind, for example in the form of coatings or moldings, are distinguished by increased mechanical strength.

The invention is illustrated in the following Examples wherein percentages are by weight unless otherwise expressed.

EXAMPLE 1

A solution of 270 g. of water in 550 g. of dioxane is added dropwise over a period of 5 hours to 2000 g. of dimethyl dichlorosilane, and the resulting reaction mixture is heated to 90° C. and then to a temperature of 200° C. accompanied by a reduction in pressure in 12 mm. Hg. The α,ω-dichloropolydiorganosiloxane thus formed contains 1.2% of chlorine.

To prepare a polydiorganosiloxane-polycarbonate block copolymer 91 g. (0.1 mole) of an α,ω-dihydroxy polycarbonate which is derived from bisphenol A and which has an average molecular weight of 910 (corresponding to p=2.7), are dissolved in 600 ml. of chlorobenzene. 16 g. of pyridine are added to the resulting solution and 585 g. of the described α,ω-dichloropolydimethylsiloxane are added dropwise to this solution over a period of 2 hours with stirring at room temperature. The reaction solution is then heated for 2 hours to 60° C., followed by the addition of 1 g. of ethanol. The pyridinium chloride formed is filtered off and the solvent removed from the filtrate by distillation. The residual product is in the form of a transparent rubbery mass at room temperature and which, when heated to 150° C., is converted into liquid form and, on cooling to room temperature, becomes viscous and elastic again. The material does not have any measurable Shore hardness, its molecular weight amounts to 40,000.

EXAMPLE 2

Reaction of the polycarbonate of Example 1 with an α,ω-dichloropolydimethylsiloxane with a chlorine content of 1.95% yields a reaction product which, at room temperature, has a Shore hardness of 20 in its uncrosslinked state and which when heated softens at a temperature around 160° C.

EXAMPLE 3

If the chain length of the α,ω-polydimethylsiloxane is further shortened and a chlorosiloxane containing 3.2% of chlorine is reacted with the polycarbonate of Example 1, an even harder product is obtained having a Shore hardness of 30 at room temperature which softens at around 170° C.

EXAMPLE 4

Further increase of the polycarbonate content of the block copolymers by reacting a dichloropolydimethylsiloxane containing 5.6% of chlorine yields a reaction product with a Shore hardness of 50 and a softening temperature of around 200° C.

EXAMPLE 5

The reaction of an α,ω-dichloropolydimethylsiloxane of molecular weight 1000 with the polycarbonate of Example 1 under the conditions described in that Example, yields a reaction product in the form of a hard material with a Shore hardness of 65 and a softening temperature of around 210° C.

EXAMPLE 6

27 g. of an α,ω-dichloropolydimethylsiloxane with a chlorine content of 7.9% are initially added dropwise with stirring to a solution of 91 g. of the polycarbonate described in Example 1 in 600 ml. of chlorobenzene, followed by the addition of 348 g. of an α,ω-dichloropolydimethylsiloxane with a chlorine content of 1.43%. A material with a Shore hardness of 30 and a softening temperature of 150° C. is isolated as the reaction product.

EXAMPLE 7

If the solution of 91 g. of the polycarbonate described in Example 1 is reacted with a mixture of 27 g. of the chlorosiloxane containing 7.9% of chlorine and 348 g. of the chlorosiloxane containing 1.43% of chlorine, rather than successively with the two different chlorosiloxanes as in Example 6, the reaction product has a Shore hardness of 22 and only softens at around 200° C.

EXAMPLE 8

The products of each of Examples 1 to 7 either as initially dissolved prior to isolation or upon subsequent dilution can be crosslinked into rubbery molding materials by reaction with about 5% of their weight of methyl triacetoxy silane at a room temperature.

It will be appreciated that the instant specification and examples are set forth by way of illustration and not limitation and that various modifications and changes may be made without departing from the spirit and scope of the present invention.

What is claimed is:

1. A polydiorganosiloxane-polycarbonate block copolymer comprising by weight about 20 to 90% of polydiorganosiloxane units of the formula $$\left[\begin{array}{c} R \\ | \\ -Si-O- \\ | \\ R \end{array}\right]_n$$

and about 80 to 10% of polycarbonate units of the formula $$\left[\begin{array}{c} \phantom{x} \\ -\phantom{x}\text{Ar}-\overset{R'}{\underset{R'}{C}}-\text{Ar}-O-\overset{O}{\underset{\phantom{x}}{C}}-O- \\ (R'')_a \quad (R'')_a \end{array}\right]_p$$

$$-\text{Ar}-\overset{R'}{\underset{R'}{C}}-\text{Ar}-O-$$
$$(R'')_a \quad (R'')_a$$

the copolymer having terminal groups of the formula $$\begin{array}{c} R \\ | \\ X-Si-O- \\ | \\ R \end{array}$$

wherein each R independently is a monovalent aliphatic, cycloaliphatic, araliphatic or aromatic hydrocarbon radical with 1 to 12 carbon atoms, each R' independently is hydrogen or a monovalent aliphatic, cycloaliphatic, araliphatic or aromatic hydrocarbon radical with 1 to 12 carbon atoms, each R'' independently is a lower alkyl radical or a halogen atom, each X is a halogen atom, a hydroxyl radical or a lower alkoxy radical, $n$ is an integer from 2 to 100, $p$ is an integer from 1 to 7, and $a$ is an integer from 0 to 4.

2. A polydiorganosiloxane-polycarbonate block copolymer according to claim 1, wherein R and R' each is lower alkyl.

3. A polydiorganosiloxane-polycarbonate block copolymer according to claim 2, wherein R and R' each is methyl, $n$ is about 15 to 100, $p$ is about 2 to 4 and $a$ is 0.

4. A polydiorganosiloxane-polycarbonate block copolymer according to claim 3, wherein X is chlorine.

5. A process for the production of a polydiorganosiloxane-polycarbonate block copolymer comprising by weight about 20 to 90% of polydiorganosiloxane units of the formula $$\left[\begin{array}{c} R \\ | \\ -Si-O- \\ | \\ R \end{array}\right]_n$$

and about 80 to 10% of polycarbonate units of the formula $$\left[\begin{array}{c} \phantom{x} \\ -\text{Ar}-\overset{R'}{\underset{R'}{C}}-\text{Ar}-O-\overset{O}{\underset{\phantom{x}}{C}}-O- \\ (R'')_a \quad (R'')_a \end{array}\right]_p$$

$$-\text{Ar}-\overset{R'}{\underset{R'}{C}}-\text{Ar}-O-$$
$$(R'')_a \quad (R'')_a$$

the copolymer having terminal groups of the formula $$\begin{array}{c} R \\ | \\ Cl-Si-O- \\ | \\ R \end{array}$$

wherein each R independently is a monovalent aliphatic, cycloaliphatic, araliphatic or aromatic hydrocarbon radical with 1 to 12 carbon atoms, each R' independently is hydrogen or a monovalent aliphatic, cycloaliphatic, araliphatic or aromatic hydrocarbon radical with 1 to 12 carbon atoms, each R'' independently is a lower alkyl radical or a halogen atom, $n$ is an integer from 2 to 100, $p$ is an integer from 1 to 7, and $a$ is an integer from 0 to 4, comprising reacting 1 mole of an α,ω-dihydroxypolycarbonate of the formula $$\text{HO}\left[\begin{array}{c} \phantom{x} \\ -\text{Ar}-\overset{R'}{\underset{R'}{C}}-\text{Ar}-O-\overset{O}{\underset{\phantom{x}}{C}}-O- \\ (R'')_a \quad (R'')_a \end{array}\right]_p$$

$$-\text{Ar}-\overset{R'}{\underset{R'}{C}}-\text{Ar}-\text{OH}$$
$$(R'')_a \quad (R'')_a$$

dissolved in an inert organic solvent, with about 1.05 to 2 moles of an α,ω-dichloropolydiorganosiloxane of the formula

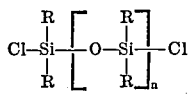

in the presence of a quantity of a tertiary amine stoichiometrically equivalent to the chlorine content of the α,ω-dichloropolydiorganosiloxane at a temperature up to about 100° C., filtering off the amine salt and removing the solvent.

References Cited
UNITED STATES PATENTS
3,189,662  6/1965  Vaughn, Jr. _____ 260—824

MELVYN I. MARQUIS, Primary Examiner

U.S. Cl. X.R.
260—46.5 R, 46.5 G, 824 EP